(No Model.)
W. H. J. HOGARTH.
DEVICE FOR DISTRIBUTING INSECT POWDER.
No. 418,026. Patented Dec. 24, 1889.
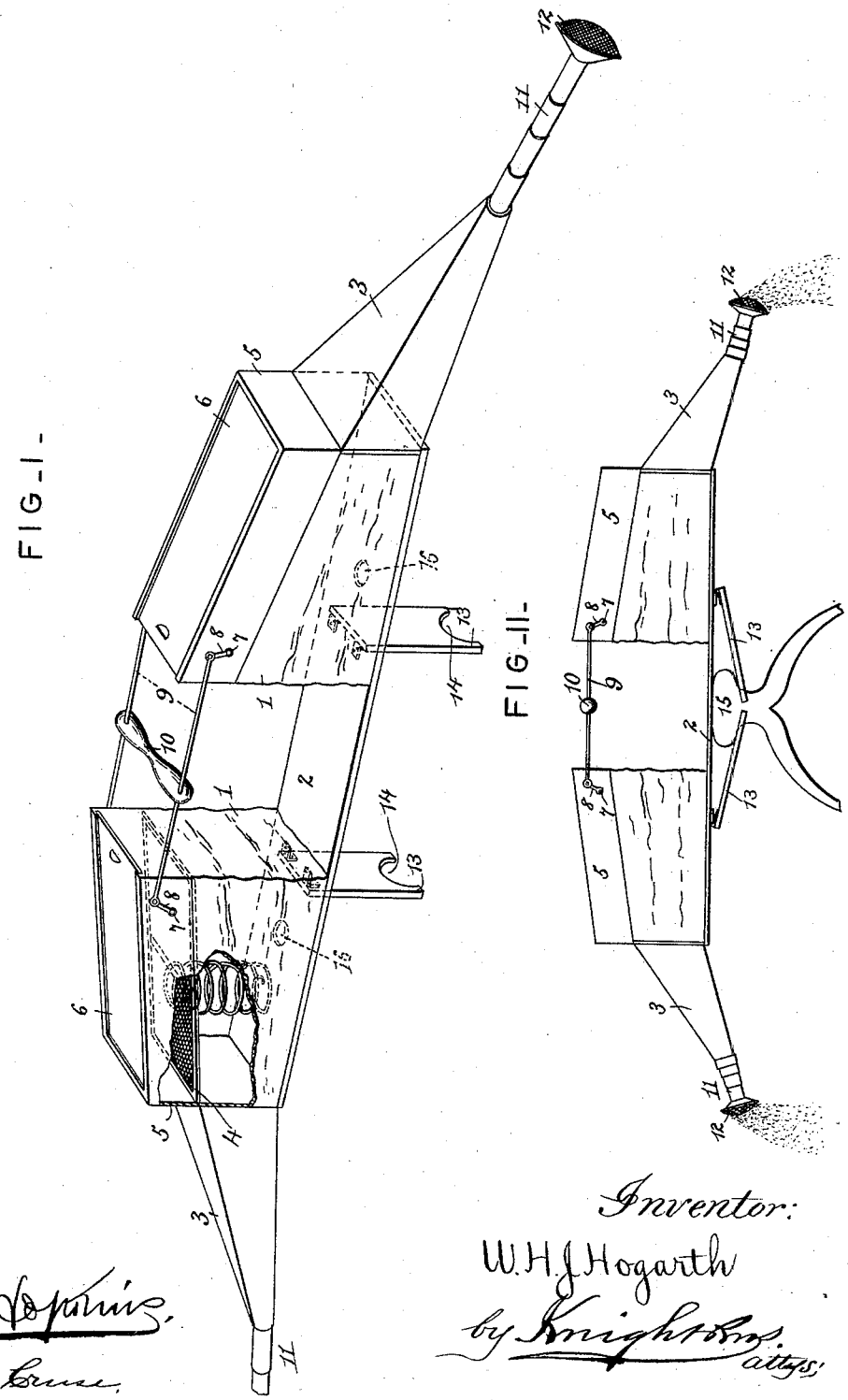

UNITED STATES PATENT OFFICE.

WILLIAM H. J. HOGARTH, OF COLUMBIA, TEXAS.

DEVICE FOR DISTRIBUTING INSECT-POWDER.

SPECIFICATION forming part of Letters Patent No. 418,026, dated December 24, 1889.

Application filed July 15, 1889. Serial No. 317,593. (No model.)

*To all whom it may concern:*

Be it known that I, WILLIAM H. J. HOGARTH, a citizen of the United States, residing at Columbia, in the county of Brazoria and State of Texas, have invented certain new and useful Improvements in Devices for Distributing Insect-Powder, of which the following is a full, clear, and exact specification.

My invention has reference to devices for sprinkling poisonous powders for the purpose of exterminating insects, and it relates more particularly to a device for distributing such powder upon cotton or other plants while growing in the field.

The object of my invention is, first, to provide a device of this kind which will be simple of construction, cheap, durable, and effective, and, second, to provide such a device with means whereby it may be conveniently carried on horseback or on any vehicle while being operated in the field.

The invention consists, essentially, of a pair of bellows secured together and each having an internal sifter arranged longitudinally therein, so as to deliver the powder to the discharge end of the bellows in proper quantities in a comminuted state, and a pair of hinged clamps serving for the attachment of the device to a saddle and being adapted to be folded up out of the way when the apparatus is to be used in a wagon or otherwise, as hereinafter more fully described.

In the accompanying drawings, which form a part of this application and which illustrate my invention, Figure I is a perspective view of the apparatus with portions broken away, showing the internal parts. Fig. II is a general view showing the device as applied to the pommel of a saddle.

1 1 represent the two bellows, of ordinary construction, secured to a base-board 2, in practice about six inches apart, and provided with the usual funnel-shaped discharge ends or nozzles 3. The upper side of each bellows, however, is open and provided with a sieve 4, composed of fine wire or other suitable gauze, and secured to the bellows over this sieve is a receptacle 5, for containing the supply of poisonous powder, provided with a sliding lid 6, whereby such receptacle may be charged from time to time. This receptacle 5, having sieve 4 for its bottom, is hinged to the inner top edge of nozzle 3 by some flexible material to allow its other end up-and-down movement. Pivoted at 7 to both sides of each of these receptacles 5 are cranks 8, which are connected together by means of rods 9. The rods 9 are joined at their mid-length by means of a suitable handle 10, by which pressure may be applied to both rods, and consequently to both bellows, simultaneously with one hand of the operator, the small cranks 8 serving to take up the longitudinal movement. The bellows, of course, are provided in their lower sides and through the base-board 2 with suitable valves 16 for the admission of air.

Secured to the outer end of each of the nozzles 3 is a telescopic tube or pipe 11, inclining downwardly slightly, so as to convey the poison more directly onto the plants. These tubes are composed of any desired number of sections, whereby their length may be adjusted to accommodate the device to the width of the rows of plants, and the outer end of each tube is preferably provided with a rose 12 for the more equal distribution of the powder.

Hinged to the under side of the board 2 are two clamps or dogs 13, whose inner or adjacent ends are notched or concave, as at 14, for the purpose of surrounding and engaging the pommel 15 of the saddle. As the distance between the ends of these two dogs is less than the width of the pommel, it will be understood that while the board 2 rests flat upon the upper end of the pommel the dogs will grip the latter and act as toggles, increasing their grip with the increase of pressure upon the board 2. If desired, these dogs or clamps may be folded flat against the under side of the board 2 and the apparatus carried through the field in a wagon, it being placed athwart the body of the wagon on the seat or any suitable board, or it may rest upon the knees of the operator while he sits upon the seat, and thus, by carrying a supply of insect-powder in the wagon or vehicle, it is possible to poison from twenty-five to thirty acres per day in a most effectual and convenient manner.

The operation of the device is as follows: The powder having been placed in the receptacle 5, having sieve-bottom, an up-and-down motion is imparted to handle 10, which imparts the same motion to the inner ends of the receptacles 5, (forming the tops of the pair of bellows,) causing the powder in said receptacles to shift from end to end, which agitation sifts the powder through the sieve 4 into the bellows proper, when the action of the air carries it out through the nozzles in a fine spray.

Having thus described my invention, the following is what I claim as new therein and desire to secure by Letters Patent:

1. In an insect-powder duster, the combination, with the bellows, of a sieve arranged therein, said sieve being substantially parallel with the top and bottom and dividing the bellows into two compartments, substantially as herein set forth.

2. In an insect-powder duster, the combination, with the bellows having a sieve arranged longitudinally therein, of a receptacle arranged above said sieve and provided with a removable cover, substantially as set forth.

3. In an insect-powder duster, the combination of the body of the bellows and the perforate wall or sieve arranged longitudinally therein, dividing the bellows into two compartments, with a nozzle or an air-outlet communicating with one compartment, whereby material placed in the other compartment on the opposite side of the sieve is agitated by the operation of the bellows and delivered to the air-blast in a comminuted state, as explained.

4. In an insect-powder duster, the combination of a pair of bellows secured together with their nozzles pointing in opposite directions and a handle for operating said bellows simultaneously, substantially as set forth.

5. In an insect-powder duster, the combination, with a pair of bellows secured together, of the rods 9, pivoted to said bellows, and an operating-handle connecting said rods together, substantially as set forth.

6. In an insect-powder duster, the combination, with a pair of bellows, of the base-board 2, upon which said bellows are secured, and the dogs 13, hinged to said board and having notched ends for engaging the saddle-pommel, substantially as set forth.

7. In an insect-powder duster, the combination, with a pair of bellows, of the base-board 2, upon which said bellows are secured, and a pair of dogs hinged to the under side of said base-board and having notched ends for engaging the saddle-pommel, substantially as set forth.

8. In an insect-powder duster, the combination, with a pair of bellows, of the base-board 2, upon which said bellows are secured, the cranks 8, pivoted to said bellows, the rods 9, pivoted to said cranks, the handle 10, connecting said rods, and the dogs 13, pivoted to the under side of the board 2 and having notched ends for engaging the saddle-pommel, substantially as set forth.

WILLIAM H. J. HOGARTH.

Witnesses:
N. EISEN,
W. H. SHARP.